United States Patent
Kuwasaki

(10) Patent No.: US 10,306,079 B2
(45) Date of Patent: May 28, 2019

(54) DEVICE MANAGEMENT APPARATUS, NON-TRANSITORY COMPUTER-READABLE STORAGE MEDIUM, AND DEVICE MANAGEMENT METHOD THAT CAN UPDATE A TABLE BASED ON DATA RECEIVED FROM A DEVICE

(71) Applicant: KYOCERA Document Solutions Inc., Osaka (JP)

(72) Inventor: Naoki Kuwasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/982,922

(22) Filed: May 17, 2018

(65) Prior Publication Data
US 2018/0338050 A1 Nov. 22, 2018

(30) Foreign Application Priority Data
May 17, 2017 (JP) .................................. 2017-098045

(51) Int. Cl.
*H04N 1/00* (2006.01)
*H04L 29/08* (2006.01)
*G06Q 30/04* (2012.01)

(52) U.S. Cl.
CPC ......... *H04N 1/00143* (2013.01); *G06Q 30/04* (2013.01); *H04L 67/303* (2013.01); *H04N 1/00278* (2013.01)

(58) Field of Classification Search
None
See application file for complete search history.

(56) References Cited

U.S. PATENT DOCUMENTS

2010/0231965 A1* 9/2010 Sunata ................. G06F 3/1203
358/1.15

FOREIGN PATENT DOCUMENTS

JP 2008-305186 A 12/2008

* cited by examiner

*Primary Examiner* — Andrew H Lam
(74) *Attorney, Agent, or Firm* — Hawaii Patent Services; Nathaniel K. Fedde; Kenton N. Fedde

(57) ABSTRACT

Provided is a device management apparatus that performs accurate billing processing. A billing-management unit, based on billing-counter information having cumulative data received from a device, updates registered information in a billing-management table that includes updated data that is updated based on the cumulative data; and a system-control unit, based on comparison results of comparing the cumulative data and the updated data, controls updating of registered information in the billing-management table by the billing-information-management unit. By comparing cumulative data received from a MFP and updated data registered in a billing-management table, a system-control unit can determine whether or not a problem has occurred in cumulative data received from a MFP. As a result, even when for some reason a problem occurs in cumulative data received from a MFP, updated data in which a problem has not occurred can be managed.

8 Claims, 5 Drawing Sheets

(BILLING-MANAGEMENT TABLE)

| MODEL CODE | PAPER SIZE | NUMBER OF SINGLE-SIDE MONOCHROME PRINTED PAGES | NUMBER OF SINGLE-SIDE COLOR PRINTED PAGES | NUMBER OF DOUBLE-SIDE MONOCHROME PRINTED PAGES | NUMBER OF DOUBLE-SIDE COLOR PRINTED PAGES | TOTAL NUMBER OF PRINTED PAGES | UPDATE DATE AND TIME |
|---|---|---|---|---|---|---|---|
| A0001 | A 4 | 50 | 100 | 150 | 200 | 2000 | 2017/01/01 (17:00) |
| | B 4 | 100 | 150 | 200 | 50 | | |
| | A 3 | 150 | 200 | 50 | 100 | | |
| | A 5 | 200 | 50 | 100 | 150 | | |
| | ⋮ | ⋮ | ⋮ | ⋮ | ⋮ | | |

(BILLING-MANAGEMENT TABLE)

| MODEL CODE 120a | PAPER SIZE 120b | NUMBER OF SINGLE-SIDE MONOCHROME PRINTED PAGES 120c | NUMBER OF SINGLE-SIDE COLOR PRINTED PAGES 120d | NUMBER OF DOUBLE-SIDE MONOCHROME PRINTED PAGES 120e | NUMBER OF DOUBLE-SIDE COLOR PRINTED PAGES 120f | TOTAL NUMBER OF PRINTED PAGES 120g | UPDATE DATE AND TIME 120h |
|---|---|---|---|---|---|---|---|
| A0001 | A4 | 50 | 100 | 150 | 200 | 2000 | 2017/01/01 (17:00) |
| | B4 | 100 | 150 | 200 | 50 | | |
| | A3 | 150 | 200 | 50 | 100 | | |
| | A5 | 200 | 50 | 100 | 150 | | |
| | ..... | ..... | ..... | ..... | ..... | | |

FIG.3A (BILLING-COUNTER INFORMATION)

| MODEL CODE | PAPER SIZE | NUMBER OF SINGLE-SIDE MONOCHROME PRINTED PAGES | NUMBER OF SINGLE-SIDE COLOR PRINTED PAGES | NUMBER OF DOUBLE-SIDE MONOCHROME PRINTED PAGES | NUMBER OF DOUBLE-SIDE COLOR PRINTED PAGES | TOTAL NUMBER OF PRINTED PAGES | TRANSMISSION DATE AND TIME |
|---|---|---|---|---|---|---|---|
| A0001 | A4 | 100 | 100 | 150 | 200 | 2200 | 2017/01/02 (17:00) |
|  | B4 | 100 | 200 | 200 | 50 |  |  |
|  | A3 | 150 | 200 | 100 | 100 |  |  |
|  | A5 | 200 | 50 | 100 | 200 |  |  |
|  | ..... | ..... | ..... | ..... | ..... |  |  |

FIG.3B

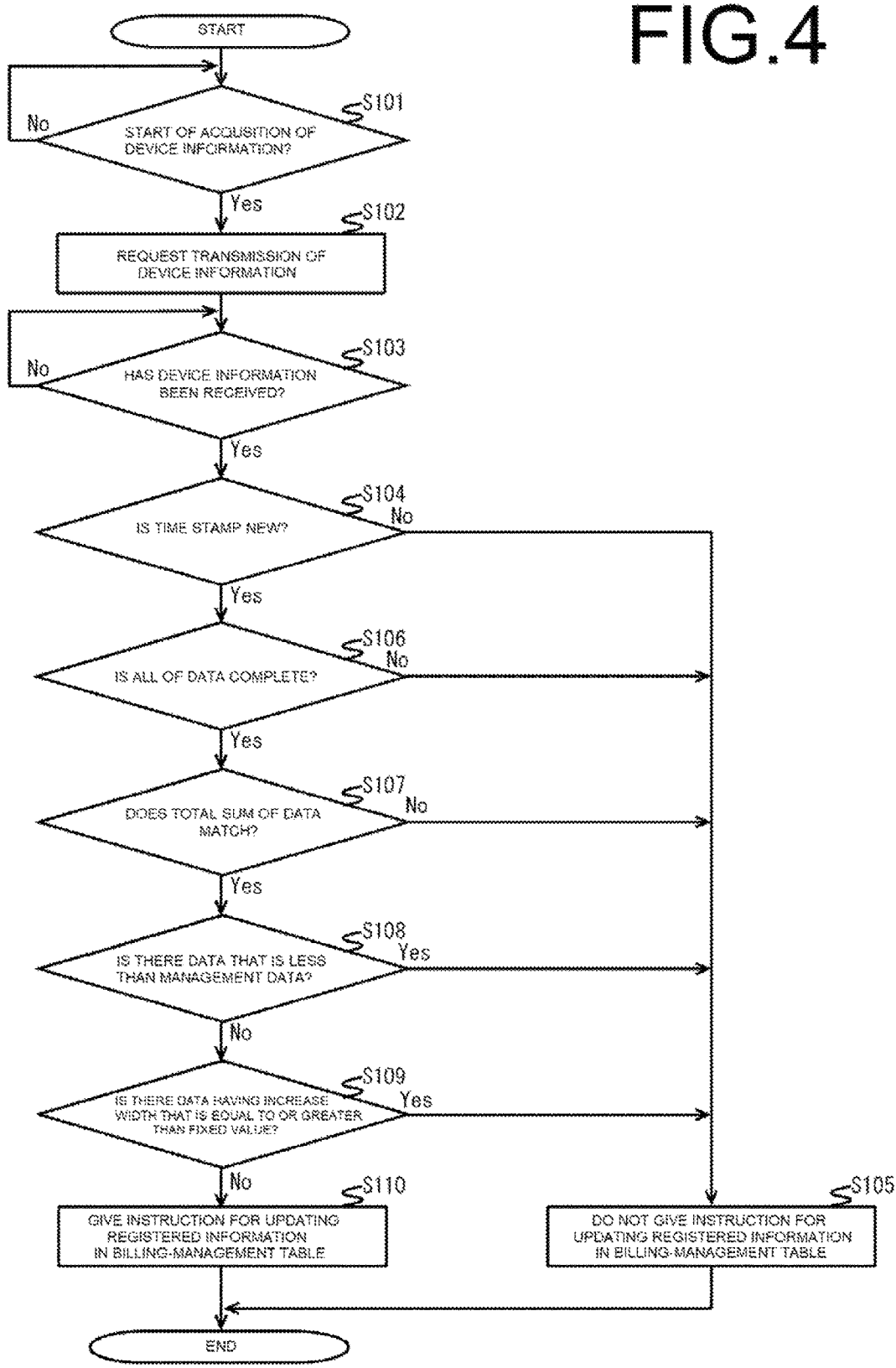

DEVICE MANAGEMENT APPARATUS, NON-TRANSITORY COMPUTER-READABLE STORAGE MEDIUM, AND DEVICE MANAGEMENT METHOD THAT CAN UPDATE A TABLE BASED ON DATA RECEIVED FROM A DEVICE

INCORPORATION BY REFERENCE

This application is based on and claims the benefit of priority from Japanese Patent Application No. 2017-098045 filed on May 17, 2017, the contents of which are hereby incorporated by reference.

BACKGROUND

The present disclosure relates to a device management apparatus, a non-transitory computer-readable storage medium, and a device management method suitable for collecting device data.

An image forming apparatus, which is one device, is provided with various life counters for measuring the degree of consumption and the like of consumables (various rollers and the like), billing counters for counting the number of sheets used of each size and type of paper used, and the like. The image forming apparatus is, for example, a MFP Multifunction Peripheral) such as a multifunction printer, combination device and the like. Moreover, the image forming apparatus is managed by a device management server that is connected via a network such as the Internet and the like. The device management server periodically acquires from the image forming apparatus, status counter information by various life counters for measuring the degree of consumption and the like of consumables (various rollers and the like) and device information that includes billing counter information by billing counters and the like. Periodically, may be, for example, once a day (for example 17:00). In addition, the device management server manages the state of the image forming apparatus based on status counter information and the like, and manages billing counter information necessary for billing processing.

In regards to this kind of billing processing, in typical technology, a billing server periodically performs a billing process for subtracting the usage fee for the image forming apparatus during a specified period from a prepaid balance for each registered user. Then, when a non-billable state occurs in which the usage fee is greater than the prepaid balance, restriction data for partially restricting the usable function items of the image forming apparatus is correlated with the user information and sent to the image forming apparatus side. On the image forming apparatus side, the sent restriction data is stored, and when restriction data that is correlated with the user information is stored, there is a billing system that partially restricts the function items of the image forming apparatus based on the restriction data.

SUMMARY

The device management apparatus according to the present disclosure includes a billing-information-management unit and a system-control unit. The billing-information-management unit, based on billing-counter information having cumulative data received from a device, updates registered information in a billing-management table that includes updated data that is updated based on the cumulative data. The system-control unit, based on comparison results of comparing the cumulative data and the updated data, controls updating of registered information in the billing-management table by the billing-information-management unit.

The non-transitory computer-readable storage medium according to the present disclosure stores a device management program that is executable by a computer of a device management apparatus. When the computer executes the device management program, a billing-information-management unit, based on billing-counter information having cumulative data received from a device, updates registered information in a billing-management table that includes updated data that is updated based on the cumulative data. Then, a system-control unit, based on comparison results of comparing the cumulative data and the updated data, controls updating of registered information in the billing-management table by the billing-information-management unit.

The device management method according to the present disclosure has a step wherein a billing-information-management unit, based on billing-counter information having cumulative data received from a device, updates registered information in a billing-management table that includes updated data that is updated based on the cumulative data. Moreover, the device management method has a step wherein a system-control unit, based on comparison results of comparing the cumulative data and the updated data, controls updating of registered information in the billing-management table by the billing-information-management unit.

DESCRIPTION OF THE DRAWINGS

FIG. 3A illustrates an example of a billing management table that is managed by the device management server in FIG. 1.

FIG. 3B illustrates an example of billing counter information that is transmitted by an MFP in FIG. 1.

FIG. 4 is a flowchart for explaining an MFP management method by the device management server in FIG. 1.

DETAILED DESCRIPTION

An embodiment of a device management apparatus according to the present disclosure will be explained below with reference to FIG. 1 to FIG. 4. It should be noted that in the explanation below, an MFP (Multifunction Peripheral), which is a combination peripheral device, is used as an example of a device that is managed by a device management apparatus. The MFP may be provided, for example, with a printing function, a copying function, a FAX function, a data transmitting/receiving function via a network, and the like.

Figure 1:
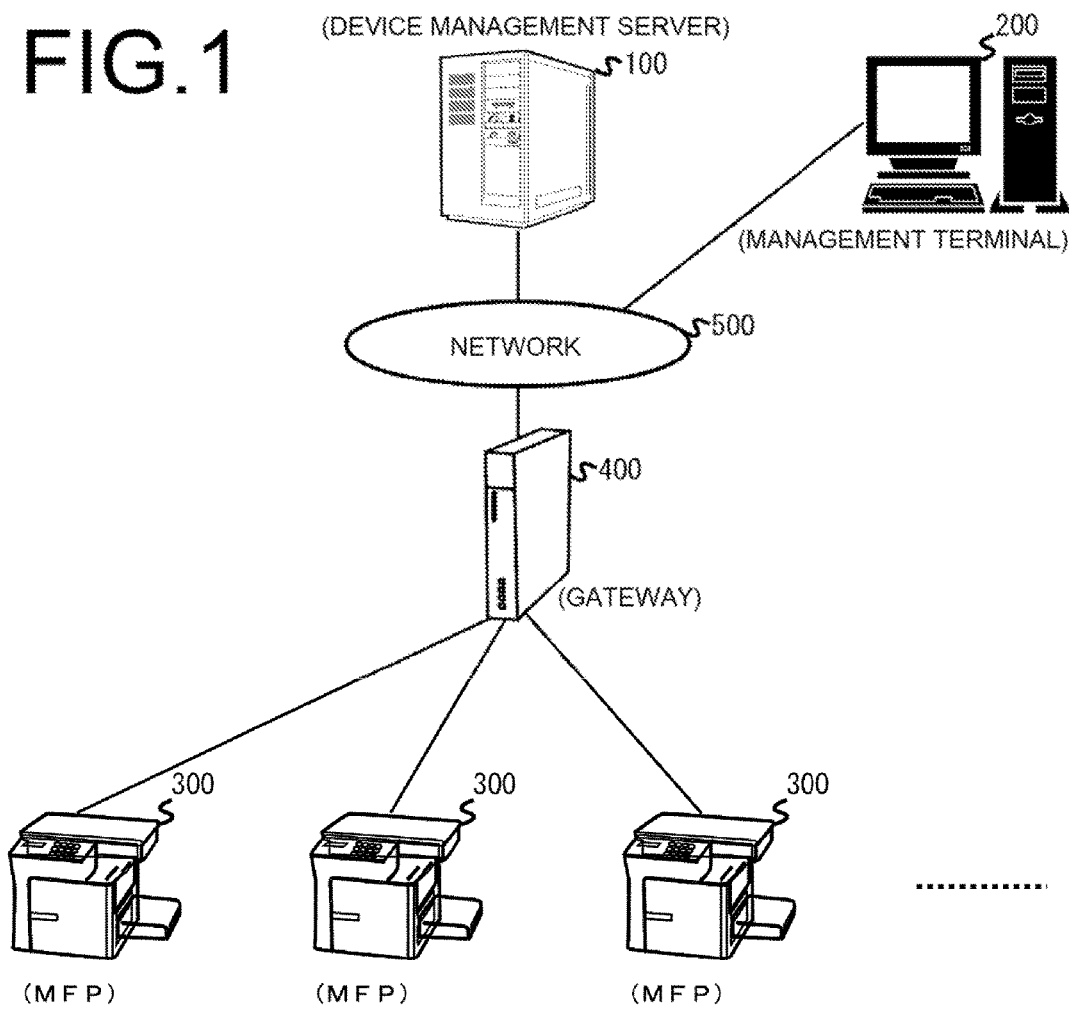
FIG. 1 illustrates configuration of a device management system according to an embodiment of a device management apparatus of the present disclosure.

First, as illustrated in FIG. 1, a device management server 100 as a device management apparatus is connected to a management terminal 200 and a gateway 400 via a network 500 such as the Internet or the like. A plurality of MFPs 300 are connected to the gateway 400. Incidentally, the configuration is not limited to a plurality of MFPs 300, and there may be only a single MFP 300.

The device management server 100 periodically acquires from an MFP 300, status-counter information by various life counters that measure the degree of consumption and the like of consumables (various rollers and the like) and device information that includes billing-counter information 330 as illustrated in FIG. 3B described later by a billing counter, and the like. Periodically may be, for example, once a day (for example, 17:00). Then, the device management server 100 manages the state of the MFP 300 based on the status-counter information and the like, and updates registered information in a billing-management table 120 as illustrated in FIG. 3A described later, for example, based on the billing-counter information 330. Incidentally, the device management server 100 manages a MFP 300 based on the model code in the item column 120a of the billing-management table 120 illustrated in FIG. 3A described later, for example. Moreover, as will be described in detail later, the device management server 100 checks whether or not the cumulative data in the billing-counter information 330 acquired from an MFP 300 is proper, and when the data is proper, updates the registered information in the billing-management table 120 illustrated in FIG. 3A described later. The management terminal 200, for example, generates billing information based on registered information in the billing-management table 120 that is managed by the device management server 100, for example, and executes a billing process (issuing a bill and the like). Furthermore, the management terminal 200 checks the status-counter information and the like that is included in the device information acquired by the device management server 100, for example, and monitors the state of the MFP 300 side.

An MFP 300, as will be described in detail later, includes various life counters for measuring the degree of consumption and the like of consumables (various rollers, and the like), a billing counter for counting the number of sheets and the like used for each size and type of paper used, and the like. In addition, the billing counter also counts usage and the like of any of the functions such as a printing function, copying function, FAX function, data transmitting/receiving function via a network, and the like. Moreover, the MFP 300 transmits status-counter information by various life counters that measure the degree of consumption and the like of consumables (various rollers, and the like) and device information that includes billing-counter information 330 by a billing counter as illustrated in FIG. 3B described later, and the like to the device management server 100 based on a periodic request from the device management server 100. Periodic may be, for example, once a day (for example, 17:00). The timing of the request from the device management server 100 can be changed arbitrarily. For example, the timing may be twice a day, or once every two days. Furthermore, the time is not limited to 17:00, and, for example, may be 8:00 AM or the like. The gateway 400 relays the transmission and reception of data between the device management server 100 and the MFP 300.

Figure 2:
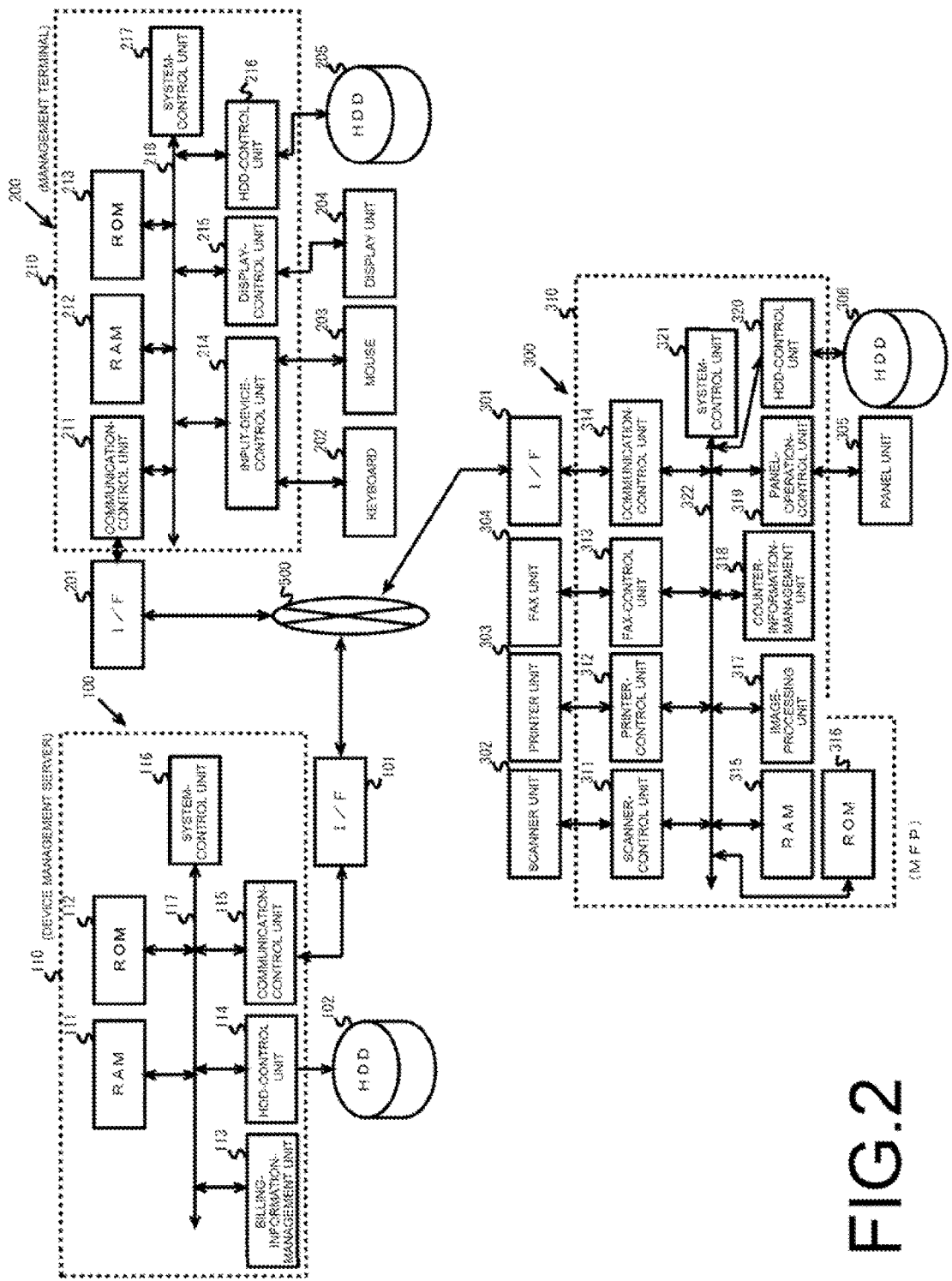
FIG. 2 illustrates an example of configuration of the device management server, the management terminal, and an MFP in FIG. 1.

Next, an example of the configuration of the device management server 100, the management terminal 200 and an MFP 300 will be explained with reference to FIG. 2. First, the device management server 100 includes a control unit 110 that controls an I/F (interface) 101 and HDD (Hard Disk Drive) 102. The I/F 101 is in charge of communication with the management terminal 200, MPF 300 and the like via a network 500. The HDD 102 is a storage device that stores application programs for providing various functions of the device management server 100, a billing-management table 120 as illustrated in FIG. 3A described later, and the like.

The control unit 110 is a processor that controls the overall operation of the device management server 100 by executing application programs, control programs and the like. The control unit 110 includes RAM (Random Access Memory) 111, ROM (Read Only Memory) 112, a billing-information-management unit 113, a HDD control unit 114, a communication-control unit 115, and a system-control unit 116. In addition, these units are connected to a data bus 117. The RAM 111 is a work memory for executing programs. The ROM 112 stores a control program for performing an operation check and the like of each of the units. The billing-information-management unit 113 manages the billing-management table 120 illustrated in FIG. 3A described later, and updates registered information in the billing-management table 120 based on billing-counter information 330 that is included in the device information from the MFP 300. The HDD control unit 114 controls reading, writing and the like of data to and from the HDD 102. The communication-control unit 115, via the I/F 101, performs control of transmission and reception of data and the like via the network 500. The system-control unit 116 periodically acquires from the MFP 300, status-counter information by various life counters that measure the degree of consumption and the like of consumables (various rollers and the like) and device information that includes billing-counter information 330 illustrated in FIG. 3B described later by a billing counter, and the like. Periodically may be, for example, once a day (for example, 17:00). Moreover, as will be described later, the system-control unit 116 checks whether or not the cumulative data of the billing-counter information 330 included in the acquired device information is proper, and when the data is proper, causes the billing-information-management unit 113 to update the registered information of the billing-management table 120 illustrated in FIG. 3A described later.

The management terminal 200 includes a control unit 210 that controls an I/F 201, a keyboard 202, a mouse 203, a display unit 204, and a HDD 205. The I/F 201 is in charge of communication with the device management server 100, the MFP 300 and the like via the network 500. The keyboard 202 is an input device for inputting characters and the like to the control unit 210. The mouse 203 is an input device for giving an instruction to the control unit 210 of an input position and the like. The display unit 204, for example, displays device information and the like that the device management server 100 receives from the MFP 300. The HDD 205 is a storage device that stores application programs and the like for providing the various functions of the management terminal 200.

The control unit 210 is a processor that controls the overall operation of the device management server 100 by executing application programs, control programs, and the like. The control unit 210 includes a communication-control unit 211, RAM 212, ROM 213, an input-device-control unit 214, a display-control unit 215, a HDD control unit 216, and a system-control unit 217. In addition, these units are connected to a data bus 218. The communication-control unit 211, via the I/F 201, performs control of transmission and reception of data and the like via the network 500. The RAM 212 is a work memory for executing programs. The ROM 213 stores a control program for performing operation checks and the like for each unit. The input-device-control unit 214 controls the input operation of the keyboard 202 and mouse 203, and sends input signals of the keyboard 202 and mouse 203 to the control unit 210. The display-control unit 215 controls the display operation of the display unit 204. The HDD control unit 216 controls reading, writing and the like of data to and from the HDD 205. The system-control unit 217, for example, acquires device information and the like that the device management server 100 receives from the MFP 300, and via the display-control unit 215, displays the device information and the like on the display unit 204. Moreover, the system-control unit 217 references the billing-management table 120 illustrated in FIG. 3A described later that is managed by the billing-information-management unit 113 of the device management server 100, and generates billing information that is necessary for the billing process.

The MFP 300 includes a control unit 310 that control the operation of an I/F 301, a scanner unit 302, a printer unit 303, a FAX (Facsimile) unit 304, a panel unit 305 and a HDD 306. Moreover, the MFP 300 includes various life counters for measuring the degree of consumption and the like of consumables (various rollers and the like), a billing counter for counting the number of sheets and the like for each size and type of paper that is used, and the like. The I/F 301 is in charge of communication with the device management server 100, management terminal 200 and the like via the network 500. In addition, the I/F 301 is in charge of communication with other MFPs 300, user terminals and the like. Incidentally, the I/F 301 may also be in charge of communication with a content sever, web server and the like via the network 500. The scanner unit 302 is a device that reads a document image by an image sensor, converts the document image into digital image data, and inputs the digital image data to the control unit 310. The printer unit 303 is a device that prints an image onto paper based on printing data that is outputted from the control unit 310. The FAX unit 304 is a device that transmits data outputted from the control unit 310 to a facsimile of another party via telephone lines, and also receives data from a facsimile of another party and inputs that data to the control unit 310. The panel unit 305 is a device such as a touch panel or the like for performing a display for the printing function, copying function, FAX function, data transmission/reception function via a network, and various settings of the MFP 300. The HDD 306 is a storage device that stores application programs and the like for providing various functions of the MFP 300. Moreover, the HDD 306 has, for example, user boxes that store printing jobs that are registered from a user terminal.

The control unit 310 is a processor that controls the overall operation of the MFP 300 by executing application programs such as for a printing function, copying function, FAX function, data transmission/reception function via a network and the like, an image forming program, a control program and the like. The control unit 310 includes a scanner-control unit 311, a printer-control unit 312, a FAX-control unit 313, a communication-control unit 314, RAM 315, ROM 316, an image-processing unit 317, a counter-information-management unit 318, a panel-operation-control unit 319, a HDD-control unit 320, and a system-control unit 321. Moreover, these units are connected to a data bus 322.

The scanner-control unit 311 controls the reading operation of the scanner unit 302. The printer-control unit 312 controls the printing operation of the printer unit 303. The FAX-control unit 313 controls the data transmission/reception operation by the FAX unit 304. The communication-control unit 314, via the I/F 301, performs control of transmission and reception of data and the like via the network 500.

The RAM 315 is a work memory for executing programs. Moreover, the RAM 315 stores printing data that has undergone image processing by the image-processing unit 317. The ROM 316 stores a control program for performing operation checks and the like of each of the units. The image-processing unit 317 performs image processing (rasterization) of image data that is read by the scanner unit 302. In addition, the image-processing unit 317 performs image processing (rasterization) of printing jobs that are registered in user boxes in the HDD 306. Incidentally, the system-control unit 321 temporarily stores printing data that has undergone image processing by the image-processing unit 317 in the RAM 315.

The counter-information-management unit 318 manages status-counter information by various life counters that measure the degree of consumption and the like of consumables (various rollers and the like) and device information that includes billing-counter information 330 illustrated in FIG. 3B described later by a billing counter, and the like. The panel-operation-control unit 319 controls the display operation of the panel unit 305. Moreover, the panel-operation-control unit 319, via the panel unit 305, receives settings and the like for starting printing, copying, a FAX, data transmission/reception via a network, and the like. The HDD-control unit 320 controls reading, writing and the like of data to and from the HDD 306. The system-control unit 321 controls linked operation and the like of each of the units. In addition, the system-control unit 321, according to a periodic request from the device management server 100, for example, transmits status-counter information that is managed by the counter-information-management unit 318 and device information that includes billing-counter information 330 and the like to the device management server 100 via the communication-control unit 314. Periodic may be, for example, once a day (for example, 17:00).

Next, the information that is managed by the device management server 100 side will be explained with reference to FIG. 3A and FIG. 3B. First, FIG. 3A illustrates an example of a billing-management table 120 that is managed by the billing-information-management unit 113 of the device management server 100. It should be noted that for convenience of explanation, the registered information in the billing-management table 120 is only the number of printed sheets of paper that are the target of billing. Moreover, the case is illustrated in which the registered information in the billing-management table 120 is updated, for example, on the date 2017/01/01, and time 17:00. The billing-management table 120 is provided, for example, with an item column 120a, an item column 120b, an item column 120c, an item column 120d, an item column 120e, an item column 120f, an item column 120g, and an item column 120h. The item column 120a indicates the model code. The item column 120b indicates the paper sizes. The item column 120c indicates the number of single-side monochrome printed pages. The item column 120d indicates the number of single-side color printed pages. The item column 120e indicates the number of double-side monochrome printed pages. The item column 120f indicates the number of double-side color printed pages. The item column 120g indicates the total number of printed pages. The item column 120h indicates the update date and time.

The model code in the item column 120a is identification information for managing the MFP 300. In addition, connection information of the MFP 300 is linked to the model code. The paper sizes in item column 120b indicate the paper sizes that are used on the MFP 300 side. The number of single-side monochrome printed pages in the item column 120c indicates updated data for the number of pages that are printed in monochrome on a single side for each paper size in the item column 120b. The number of single-side color printed pages in the item column 120d indicates updated data for the number of pages that are printed in color on a single side for each paper size in the item column 120b. The number of double-side monochrome printed pages in the item column 120*e* indicates the updated data for the number of pages that are printed in monochrome on both sides for each paper size in the item column 120*b*. The number of double-side color printed pages in the item column 120*f* indicates the updated data for the number of pages that are printed in color on both sides for each paper size in the item column 120*b*. The total number of printed pages in the item column 120*g* indicates updated data for the total number of printed pages in the item columns 120*c* to 120*f*. The update date and time in the item column 120*h* indicates updated data for the date and time when the registered information in the billing-management table 120 is updated based on the billing-counter information 330 in FIG. 3B described later that is included in the device information periodically acquired from the MFP 300. Periodically may be, for example, once a day (for example, 17:00). Incidentally, for the convenience of explanation, it is assumed that at the time (17:00) of the update date/time there is no time lag with respect to the time (17:00) when the device information is acquired from the MFP 300.

Next, FIG. 3B illustrates an example of billing-counter information 330 that is managed by the counter-information-management unit 318 of the MFP 300. Incidentally, the MFP 300 transmits the contents of the billing-counter information 330 according to a request from the device management server 100. Moreover, the case is illustrated in which the contents of the billing-counter information 330 are transmitted on the date 2017/01/02 and time 17:00, for example. Data corresponding to the item columns 330*a* to 330*h* below are written in the billing-counter information 330 according to a specified format, for example. In other words, the billing-counter information 330 is provided, for example, with an item column 330*a*, an item column 330*b*, an item column 330*c*, an item column 330*d*, an item column 330*e*, an item column 330*f*, an item column 330*g*, and an item column 330*h*. The item column 330*a* indicates a model code. The item column 330*b* indicates paper sizes. The item column 330*c* indicates the number of single-side monochrome printed pages. The item column 330*d* indicates the number of single-side color printed pages. The item column 330*e* indicates the number of double-side monochrome printed pages. The item column 330*f* indicates the number of double-side color printed pages. The item column 330*g* indicates the total number of printed pages. The item column 330*h* indicates the transmission date and time.

Model code that is identification information for managing the MFP 300 is written in the item column 330*a*. Data indicating the paper sizes that can be used on the MFP 300 side are written in the item column 330*b*. Cumulative data of the number of pages printed in monochrome on a single side for each paper size is written in the item column 330*c*. Cumulative data of the number of pages printed in color on a single side for each paper size is written in the item column 330*d*. Cumulative data of the number of pages printed in monochrome on both sides for each paper size is written in the item column 330*e*. Cumulative data of the number of pages printed in color on both sides for each paper size is written in the item column 330*f*. Cumulative data of the total number of printed pages indicating the total number of printed pages in the item columns 330*c* to 330*f* is written in item column 330*g*. Data of the transmission date and time when the billing-counter information 330 is transmitted according to a request from the device management server 100 is written in the item column 330*h*.

Here, the registered information in the billing-management table 120 that is managed by the billing-information-management unit 113 of the device management server 100 illustrated in FIG. 3A is for the previous day with respect to the contents of the billing-counter information 330 that is transmitted by the MFP 300 illustrated in FIG. 3B. In other words, in the billing-counter information 330, cumulative data enclosed in the dotted lines, for example, such as in the case of the item columns 330*c* to 330*g*, for example, are larger values than the update data in the item columns 120*c* to 120*g* in the billing-management table 120. Then, on the device management server 100 side, as will be described in detail later, whether or not the newly received billing-counter information 220 data is proper or not is checked, and when the data is proper, the registered information of the billing-management table 120 is updated based on the new billing-counter information 330 illustrated in FIG. 3B.

Next, the device management method by the device management server 100 will be explained with reference to FIG. 4. In addition, in the explanation below, it will be assumed that the device management server 100 periodically requests the MFP 300 to transmit device information that includes billing-counter information 330. Periodically may be, for example, once a day (17:00).

(Step S101)

The system-control unit 116 determines whether or not acquisition of device information is started.

In this case, when the system-control unit 116 checks the time from a time counter and the time has not yet reached 17:00, for example, the system-control unit 116 determines that acquisition of device information has not started (step S101: NO).

However, when the system-control unit 116 checks the time from a time counter and the time has reached 17:00, for example, the system-control unit 116 determines that acquisition of device information has started (step S101: YES). Then processing moves to step S102.

(Step S102)

The system-control unit 116 requests transmission of device information.

In this case, the system-control unit 116, via the communication-control unit 115, requests the MFP 300 to transmit device information.

(Step S103)

The system-control unit 116 determines whether or not device information is received.

In this case, when there is no notification from the communication-control unit 115 indicating that device information is received, the system-control nit 116 determines that device information is not received (step S103: NO).

However, when there is a notification from the communication-control unit 115 indicating that device information is received, the system-control unit 116 determines that device information is received (step S103: YES). Then, processing moves to S104. Moreover, the system-control unit 116 temporarily stores billing-counter information 330 that is included in the device information in the HDD 102 via the HDD-control unit 114.

(Step S104)

The system-control unit 116 determines whether or not the time stamp is new.

In this case, the system-control unit 116 compares the date and time in the item column 120*h* in the billing-management table 120 in FIG. 3A that is managed by the billing-information-management unit 113 with the date and time in the item column 330*h* in the billing-counter information 330 in FIG. 3B that is included in the device information. When the date and time in the item column 330*h* in the billing-counter information 330 is older than the date and time in the item column 120h in the billing-management table 120, the system-control unit 116 determines that the time stamp is not new (step S104: NO). Then, processing moves to step S105. For example, a case in which for some reason, the billing-counter information is installed from outside the MFP 300 due to an incorrect value of the billing counter, for example, corresponds to a case in which the time stamp is not new.

On the other hand, the system-control unit 116 compares the date and time in the item column 120h in the billing-management table 120 in FIG. 3A that is managed by the billing-information-management unit 113 with the date and time in the item column 330h in the billing-counter information 330 in FIG. 3B that is included in the device information. When the date and time in the item column 330h in the billing-counter information 330 is newer than the date and time in the item column 120h in the billing-management table 120, the system-control unit 116 determines that time stamp is new (step S104: YES). Then, processing moves to step S106.

(Step S105)

The system-control unit 116 avoids giving an instruction to update the registered information of the billing-management table 120.

In this case, the system-control unit 116 does not give an instruction to the billing-information-management unit 113 to update the contents based on the billing-counter information 330 in FIG. 3B that is included in the device information.

Incidentally, the system-control unit 116 deletes the billing-counter information 330 that is stored in the HDD 102.

(Step S106)

The system-control unit 116 determines whether or not all of the data is complete.

In this case, the system-control unit 116 checks the data for the number of printed pages in the item columns 330c to 330g in the billing-counter information 330 in FIG. 3B that is included in the device information. When part or all of the cumulative data that corresponds to the updated data for the number of printed pages in the item columns 120c to 120g in the billing-management table 120 in FIG. 3A that is managed by the billing-information-management unit 113 is missing, the system-control unit 116 determines that all of the data is not complete (step S106: NO). Then processing moves to step S105. For example, a case in which part or all of the values of the billing counter are missing due to a problem in the MFP 300 corresponds to a case when not all of the data is complete.

Incidentally, even when all of the data is complete, when there is cumulative data that cannot be read due to corrupted data or the like, the system-control unit 116 determines that not all of the data is complete.

On the other hand, the system-control unit 116 checks the cumulative data for the number of printed pages in the item columns 330c to 330g in the billing-counter information 330 in FIG. 3B that is included in the device information. When there is no missing cumulative data that corresponds to the updated data for the number of printed pages in the item columns 120c to 120g in the billing-management table 120 in FIG. 3A that is managed by the billing-information-management unit 113, the system-control unit 116 determines that all of the data is complete (step S106: YES). Then processing moves to step S107.

(Step S107)

The system-control unit 116 determines whether the total sum of the data matches.

In this case, the system-control unit 116 totals the cumulative data of the number of printed pages in the item columns 330c to 330f in the billing-counter information 330 in FIG. 3B that is included in the device information. Then, when the totaled cumulative data of the number of printed pages does not match the cumulative data of the total sum of the total number of printed pages in the item column 330g, the system-control unit determines that there is a deviation (step S107: NO). Then processing moves to step S105. For example, a case in which part or all of the values in the billing counter are not proper due to a problem in the MFP 300 corresponds to the case in which the total sum of the data does not match.

On the other hand, the system-control unit 116 totals the cumulative data of the number of printed pages in the item columns 330c to 330f in the billing-counter information 330 in FIG. 3B that is included in the device information. Then, when the totaled cumulative data of the number of printed pages matches the cumulative data of the total sum of the total number of printed pages in the item column 330g, the system-control unit determines that there is no deviation (step S107: YES). Then processing moves to step S108.

(Step S108)

The system-control unit 116 determines whether or not there is data that is less than the management data.

In this case, the system-control unit 116 compares the cumulative data of the number of printed pages in the item columns 330c to 330g in the billing-counter information 330 in FIG. 3B that is included in the device information with the updated data of the number of printed pages in the item columns 120c to 120g in the billing-management table 120 in FIG. 3A that is managed by the billing-information-management unit 113. As a result, when part or all of the cumulative data of the number of printed pages in the item columns 330c to 330g in the billing-counter information 330 is less than the updated data of the number of printed pages in the item columns 120c to 120g in the billing-management table 120, the system-control unit 116 determines that there is data that is less than the management data (step S108: YES). Then processing moves to step S105. For example, a case in which part or all of the values of the billing counter are not proper due to a problem in the MFP 300 corresponds to a case in which there is data that is less than the management data.

On the other hand, the system-control unit 116 compares the cumulative data of the number of printed pages in the item columns 330c to 330g in the billing-counter information 330 in FIG. 3B that is included in the device information with the updated data of the number of printed pages in the item columns 120c to 120g in the billing-management table 120 in FIG. 3A that is managed by the billing-information-management unit 113. As a result, when part or all of the cumulative data of the number of printed pages in the item columns 330c to 330g in the billing-counter information 330 is equal to or greater than the updated data of the number of printed pages in the item columns 120c to 120g in the billing-management table 120, the system-control unit 116 determines that there is no data that is less than the management data (step S108: NO). Then processing moves to step S109.

(Step S109)

The system-control unit 116 determines whether or not there is data having an increase width that is equal to or greater than a fixed value.

In this case, the system-control unit 116 compares cumulative data of the number of printed pages in the item columns 330c to 330g in the billing-counter information 330 in FIG. 3B that is included in the device information with updated data of the number of printed pages in the item columns 120c to 120g in the billing-management table 120 in FIG. 3A that is managed by the billing-information-management unit 113. As a result, when the increase width of part or all of the cumulative data of the number of printed pages in the item columns 330c to 330g in the billing-counter information 330 is confirmed to be equal to or greater than a fixed value, the system-control unit 116 determines that there is data having an increase width that is equal to or greater than a fixed value (step S109: YES). Processing then moves to step S105.

On the other hand, the system-control unit 116 compares cumulative data of the number of printed pages in the item columns 330c to 330g in the billing-counter information 330 in FIG. 3B that is included in the device information with updated data of the number of printed pages in the item columns 120c to 120g in the billing-management table 120 in FIG. 3A that is managed by the billing-information-management unit 113. When the increase width of part or all of the cumulative data of the number of pages in the item columns 330c to 330g in the billing-counter information 330 is confirmed to be not equal to or greater than a fixed value, the system-control unit 116 determines that there is no data having an increase width that is equal to or greater than a fixed value (step S109: NO). Processing then moves to step S110.

Incidentally, in regards to the increase width of the cumulative data, a fixed width may be determined beforehand, or a fixed width may be determined based on the past usage state of the MFP 300.

(Step S110)

The system-control unit 116 gives an instruction to update the registered information in the billing-management table 120.

In this case, the system-control unit 116 gives an instruction to the billing-information-management unit 113 to update the registered information in the billing-management table 120. Moreover, the system-control unit 116 gives notification of the registration destination for the billing-counter information 330 in the HDD 102.

At this time, the billing-information-management unit 113 reads the billing-counter information 330 from the HDD 102 and updates the registered information in the billing-management table 120.

In this way, in this embodiment, the billing-information-management unit 113 of the device management server 100, based on billing-counter information 330 having cumulative data that is received from the MFP 300 (device), updates registered information in the billing-management table 120 that includes updated data that is updated based on the cumulative data, and the system-control unit 116, based on comparison results of comparing the cumulative data and updated data, controls updating of registered information in the billing-management table 120 by the billing-information-management unit 113.

In other words, updated data that is registered in the billing-management table 120 is updated based on cumulative data that is received from the MFP 300 (device). Therefore, the cumulative data that is received from the MFP 300 (device) includes contents that are newer than the updated data that is registered in the billing-management table 120. Here, by comparing the cumulative data that is received from the MFP 300 (device) with the updated data that is registered in the billing-management table 120, the system-control unit 116 is able to determine whether or not any problems have occurred in the cumulative data that is received from the MFP 300 (device). As a result, even in the case that for some reason a problem occurs in the cumulative data that is received from the MFP 300 (device), it is possible to manage the updated data in which a problem has not occurred, and thus it is possible to perform accurate billing processing.

In addition, in this embodiment, the billing-management table and the billing-counter information indicate the number of printed pages, however, may also indicate the number of printed surfaces or some other counted value.

Moreover, in this embodiment, an example of a MFP 300 as a device is used, however, the embodiment is not limited to this example, and this technology may also be applied to other devices such as a portable terminal, medical device and the like that employ a pay-peruse lease form of usage.

In a typical billing system described above, even in a case in which billing cannot be performed such as in the case of an insufficient prepaid balance or the like, by partially restricting function items based on restriction data, it is possible to avoid making the user feel remarkably inconvenienced, and also billing management can be simplified.

In that billing system, the case is explained in which a billing server periodically performs a billing process for each registered user that subtracts the fee for using the image information device during a set period from the prepaid balance. In this case, when, for some reason, a problem occurs in data that indicates the fee for using the image information device, for example, there is a problem in that it is possible that data indicating the correct fee for using the image information device cannot be collected, and thus accurate billing processing cannot be performed.

With the device management apparatus, storage medium and device management method according to the present disclosure it is possible to determine whether or not a problem has occurred in the cumulative data received from a device. As a result, even when for some reason a problem occurs in the cumulative data received from a device, it is possible to manage updated data in which there is no problem, and accurate billing processing can be performed.

What is claimed is:

1. A device management apparatus, comprising:
   a billing-information-management unit that, based on billing-counter information having cumulative data received from a device, updates registered information in a billing-management table that includes updated data that is updated based on the cumulative data; and
   a system-control unit that
   based on comparison results of comparing the cumulative data and the updated data, checks whether or not the cumulative data is proper,
   when the cumulative data is proper, causes the billing-information-management unit to update registered information in the billing-management table, and
   when the cumulative data is not proper, causes the billing-information-management unit to avoid updating the registered information in the billing-management table.

2. The device management apparatus according to claim 1, wherein
   a first time stamp that indicates a transmission date and time is included in the billing-counter information;
   a second time stamp that indicates an update date and time is included in the billing-management table; and
   when the first time stamp is older than the second time stamp, the system control unit determines that the cumulative data is not proper.

3. The device management apparatus according to claim 1, wherein
   a plurality of the cumulative data is included in the billing-counter information;

a plurality of the updated data is included in the billing-management table; and when part or all of the cumulative data that corresponds to the plurality of updated data is missing, the system-control unit determines that the cumulative data is not proper.

4. The device management apparatus according to claim 2, wherein cumulative total sum data that indicates the total sum of a plurality of the cumulative data is included in the billing-counter information; and when a total sum of the cumulative data and the cumulative total sum data do not match, the system-control unit determines that the cumulative data is not proper.

5. The device management apparatus according to claim 2, wherein when part or all of the cumulative data is less than the value of the updated data, the system-control unit determines that the cumulative data is not proper.

6. The device management apparatus according to claim 2, wherein when the increase width of part or all of the cumulative data is equal to or greater than a fixed value, the system-control unit determines that the cumulative data is not proper.

7. A non-transitory computer-readable storage medium for storing a device management program that is executable by a computer of a device management apparatus, and when the computer executes the device management program, a billing-management unit, based on billing-counter information having cumulative data received from a device, updates registered information in a billing-management table that includes updated data that is updated based on the cumulative data; and a system-control unit that based on comparison results of comparing the cumulative data and the updated data, checks whether or not the cumulative data is proper, when the cumulative data is proper, causes the billing-information-management unit to update registered information in the billing-management table, and when the cumulative data is not proper, causes the billing-information-management unit to avoid updating the registered information in the billing-management table.

8. A device management method comprising:

a step wherein a billing-management unit, based on billing-counter information having cumulative data received from a device, updates registered information in a billing-management table that includes updated data that is updated based on the cumulative data; and a step wherein a system-control unit based on comparison results of comparing the cumulative data and the updated data, checks whether or not the cumulative data is proper, when the cumulative data is proper, causes the billing-information-management unit to update registered information in the billing-management table, and when the cumulative data is not proper, causes the billing-information-management unit to avoid updating the registered information in the billing-management table.

* * * * *